US008170557B2

(12) United States Patent  
Veres et al.

(10) Patent No.: US 8,170,557 B2  
(45) Date of Patent: May 1, 2012

(54) REDUCING BUFFER OVERFLOW (75) Inventors: Andras Veres, Budapest (HU); Gabor Nemeth, Budapest (HU); Ferenc Kubinszky, Szentendre (HU); Gergely Biczok, Budapest (HU); Peter Tarjan, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 324 days.

(21) Appl. No.: 12/525,716

(22) PCT Filed: Feb. 8, 2007

(86) PCT No.: PCT/EP2007/051204  
§ 371 (c)(1),  
(2), (4) Date: Nov. 6, 2009

(87) PCT Pub. No.: WO2008/095535  
PCT Pub. Date: Aug. 14, 2008

(65) Prior Publication Data  
US 2010/0056151 A1  Mar. 4, 2010

(51) Int. Cl.  
*H04W 36/00* (2009.01)
(52) U.S. Cl. ........ 455/436; 370/335; 370/229; 370/235; 370/232
(58) Field of Classification Search .......... 455/436–444; 370/335, 229, 235, 232  
See application file for complete search history.

(56) References Cited

U.S. PATENT DOCUMENTS

| 5,315,586 | A  | * | 5/1994  | Charvillat ............... 370/232 |
| 5,898,671 | A  | * | 4/1999  | Hunt et al. .............. 370/235 |
| 6,993,342 | B2 | * | 1/2006  | Kuchibhotla et al. ..... 455/450 |
| 2001/0015956 | A1 | * | 8/2001 | Ono ....................... 370/229 |
| 2002/0137514 | A1 |   | 9/2002 | Mitsugi et al. |
| 2003/0031210 | A1 | * | 2/2003 | Harris ..................... 370/516 |
| 2004/0246930 | A1 | * | 12/2004 | Fong et al. ............... 370/335 |
| 2006/0077994 | A1 |   | 4/2006 | Spindola |
| 2007/0014259 | A1 |   | 1/2007 | Fajardo et al. |
| 2011/0273985 | A1 | * | 11/2011 | Siemens et al. ........... 370/235 |

FOREIGN PATENT DOCUMENTS

| EP | 1 507 352 A1 | 2/2005 |
| WO | WO 01/30090 A | 4/2001 |
| WO | WO 2007/007913 A1 | 1/2007 |

* cited by examiner

Primary Examiner — Charles Shedrick (57) ABSTRACT

A method of reducing buffer overflow in a cellular radio network caused by a transfer of data from a buffer in a first cell to a buffer in a second cell when a handover of mobile equipment from said first cell to said second cell occurs. The method comprises temporarily increasing an amount of temporary buffer space required to handle data transferred from the buffer of the first cell to the buffer of the second cell. In one embodiment of the method, prior to increasing the amount of temporary buffer space, the amount of temporary buffer space required is calculated.

9 Claims, 5 Drawing Sheets

REDUCING BUFFER OVERFLOW

FIELD OF THE INVENTION

The invention relates to the field of reducing buffer overflow during handover of mobile equipment from one cell to another in a Radio Access Network.

BACKGROUND OF THE INVENTION

A cellular mobile access network is a radio network made up of a number of cells, each cell being served by a fixed transmitter. Cells are used to cover different areas in order to provide radio coverage over a wider area than the area of one cell.

Figure 1:
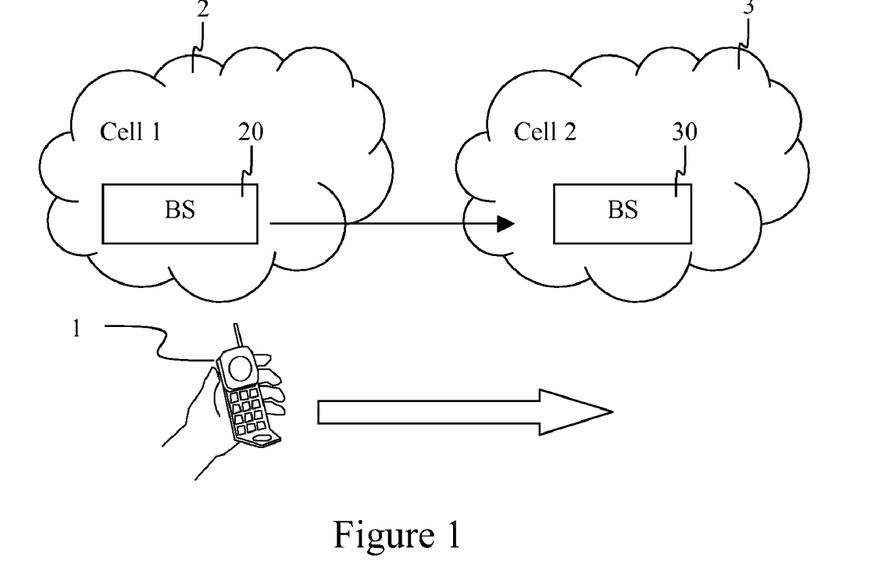
FIG. 1 illustrates schematically buffer transfer between two cells in a mobile network during handover.

As shown in FIG. 1, when a user with mobile equipment 1 moves between the areas covered by adjacent cells 2, 3, a handover must be performed between those cells. A connection between the mobile equipment 1 and the old cell 2 is broken, and a new connection between the mobile equipment 1 and a new cell 3 is established. During this procedure, the servicing of data packets to and from the mobile equipment 1 is halted for a short time. The cells may comprise a Base Station, Radio Network Controller, or other similar device that has a downlink buffer. Data held in the downlink buffer at the old cell 2 must be transferred to the downlink buffer of the new cell 3.

In 3G networks, this is solved by a special procedure and signalling standardized by 3GPP. In current 3G networks the buffer transfer procedure is done infrequently only when the user moves between Radio Network Controllers (RNCs). In future Long Term Evolution (LTE) technology, it is planned that this procedure will be done frequently because the packets are stored in the Base Stations (BSs) 20, 30, as illustrated in FIG. 1, and will therefore be transferred between base stations during cell handover. Nevertheless, the 3GPP solution does not ensure a continuous and seamless user experience when the user moves between cells.

If the mobile equipment is active (for example it is downloading a file) when the handover occurs, there are packets stored in the downlink buffer of the BS or RNC. During the handover, these packets need to be handled in order to ensure a seamless user experience. If the packets are simply dropped, the end-user would experience a significant and long-lasting download throughput degradation at cell handover. To avoid this, 3GPP TS 43.129 specifies how packet-switched handovers are performed, but does not get round the problem of packets being lost. In future systems, such as 3GPP LTE, this procedure is triggered every time the mobile equipment is involved in a hand-over between cells.

Figure 2:
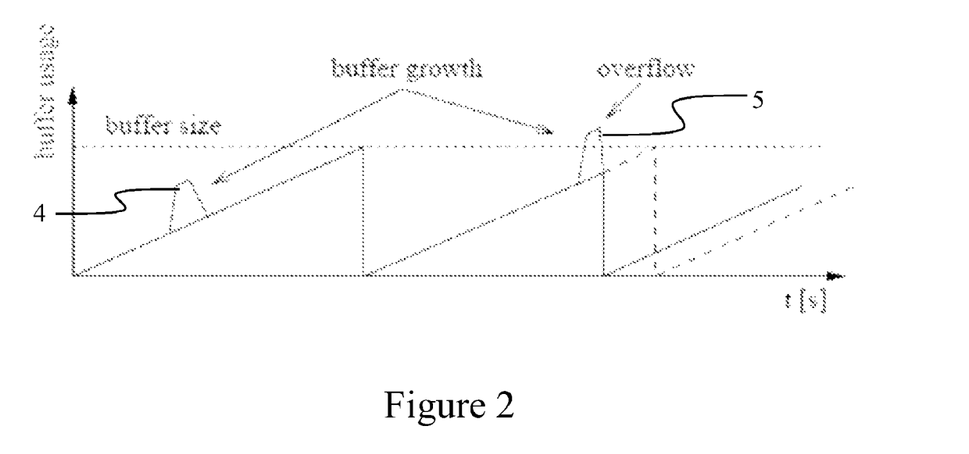
FIG. 2 shows a graph illustrating the effects of service interruption on of buffer usage against time at a node holding the downlink user data packets.

The buffer transfer procedure is not sufficient to avoid throughput degradation and packet loss from the buffer. During a handover, the service to the mobile equipment is stopped for a short time. This time period is called outage time. During outage time, the data sender (a Transmission Control Protocol, TCP, server) is unaware of the outage, and continues to send data. Using high speed networks that use, for example, High Speed Downlink Packet Access (HSDPA), enhanced HSDPA, LTE, 4G, 802.11, WiMAX, even where the outage time is short, the uninterrupted data flow to the buffer may cause a sudden buffer overflow and a large burst of packets will be lost in a sequence. This is illustrated in FIG. 2. Buffer growth is caused by service interruption (e.g. during a mobile handover). During this time, packet servicing from the buffer is suspended, but the buffer filling is not stopped. The buffer therefore fills at an increased rate. Regions of buffer growth are illustrated 4, 5. In some circumstances, the buffer growth 5 may cause the buffer usage to exceed the buffer size, which leads to lost packets. Buffer usage may be exceeded in the buffer of the new cell or of a Radio Network Controller (RNC), depending on the hardware used.

Figure 3:
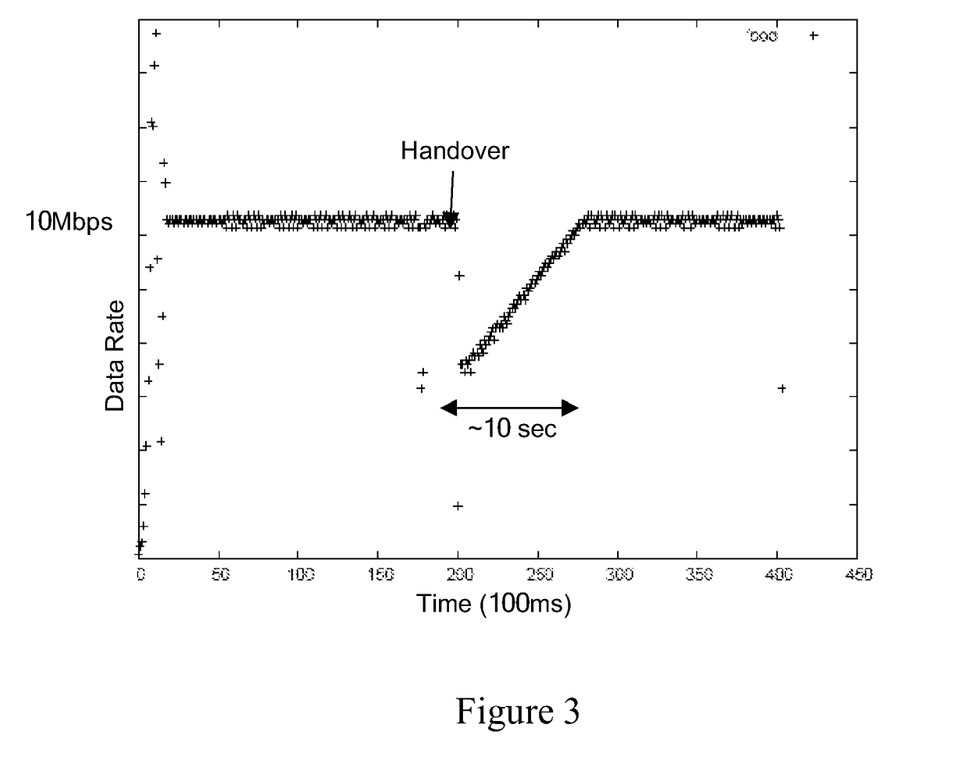
FIG. 3 shows a graph of TCP data transfer rate against time before and after a handover.

FIG. 3 shows an example measurement of a 3GPP SAE/LTE intra-system handover case. The graph shows the TCP data rate both before and after a handover between cells. Before handover, the data transfer rate is around 10 Mbps. At handover, the data rate drops to around 5 Mbps, and takes around 10 seconds to recover back to 10 Mbps.

The loss caused by buffer overflow causes TCP to assume erroneously that there is congestion, and so the TCP responds by halving its congestion window. In the case of a time out, the TC data rate may be reduced to zero. In order to avoid this from happening, it is necessary to avoid buffer overflow.

One solution to avoid buffer overflow is to provide a very large buffer. However, this is undesirable for the following reasons:

1. A large buffer would be unnecessary for >90% of the time, leading to inefficient use of resources;
2. Buffers in mobile nodes are costly; and
3. Large buffers have a negative impact on end-to-end applications, reduce responsiveness and increase round-trip time.

SUMMARY

The invention provides dynamic allocation of the necessary amount of extra buffering to the mobile equipment that needs it during a handover. In this way, buffering cost is saved, small round-trip times can be maintained and buffer overflow can be reduced or eliminated.

According to a first aspect of the invention, there is provided a method of reducing buffer overflow in a cellular radio network caused by a service interruption during a handover of mobile equipment from a first cell to a second cell occurs, the method comprising:

temporarily increasing an amount of buffer space required to handle increased buffer usage caused by said service interruption.

By dynamically allocating buffer space required for a handover, the amount of buffer space needed is greatly reduced compared to a static allocation of buffer space. To further increase the efficiency of buffer usage, the method may further comprise, prior to temporarily increasing an amount of temporary buffer space required, calculating the amount of temporary buffer space required to handle the increased buffer usage caused by the service interruption.

The calculation may comprise either the product of the data transfer rate before cell handover and the outage time during the cell handover, or the product of the data transfer rate before cell handover and the base round trip time. The calculation is usually performed on the basis of the minimum of either the product of the data transfer rate before cell handover and the outage time during the cell handover, or the product of the data transfer rate before cell handover and the base round trip time.

In order to release the reserved buffer space for other handovers, the method may further comprise releasing the reserved buffer space once a predetermined time period has elapsed. Where the data is transferred using Transmission Control Protocol, the method may further comprise sending Transmission Control Protocol rate decrease signals prior to releasing the reserved buffer space. This ensures that reserved buffer space is not released where the buffer still contains packets after the predetermined time period has elapsed.

The method is suitable for implementation for most nodes in the network. For example, the amount of temporary buffer space required may be calc at any one of the first cell, the second cell, a cell controller, and the mobile equipment.

According to a second aspect of the invention, there is provided a network node for use in an access network comprising:
a buffer;
a processor for calculating an amount of temporary buffer space required; and
means for reserving a portion of the buffer according to the calculated amount of temporary buffer space required, the reserved portion for use during a cell handover.

According to a third aspect of the invention, there is provided a network node for use in a radio access network cell comprising:
a processor for calculating an amount of temporary buffer space required; and
a transmitter for sending the calculated amount of temporary buffer space required to a node in a second radio access network cell when handover of mobile equipment from the radio access network cell to the second radio access network cell occurs.

DETAILED DESCRIPTION

Figure 4:
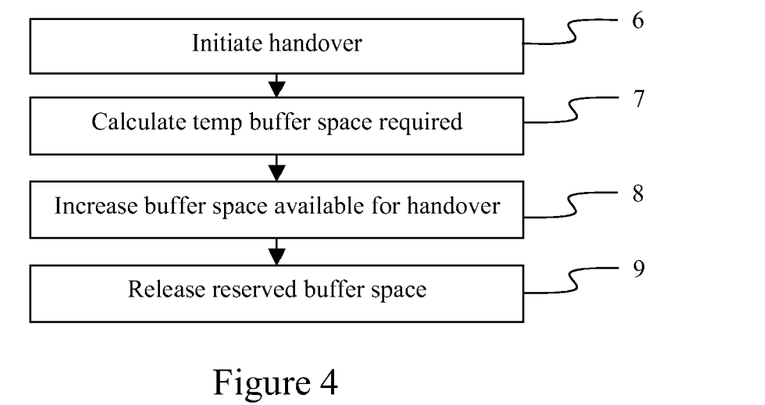
FIG. 4 shows a flow chart illustrating the basic steps of the invention.

An extended buffer transfer procedure is provided that allows for temporary buffer inflation. FIG. 4 shows the basic steps of an embodiment of the invention. When a handover of mobile equipment from one cell to another occurs, buffer transfer procedure is initiated 6 to the new cell. The amount of buffer space required is calculated 7, and the downlink buffer size at the receiving node is temporarily increased 8 by a certain amount. Once the handover is complete, and the peak in buffer usage has expired, the reserved buffer space is released 9.

The amount of buffer space required is given by the following equation:

$$B_{temp} = B_{default} + B_{growth} \quad (1)$$

where
$B_{temp}$ is the temporarily extended downlink buffer size;
$B_{default}$ is the default downlink buffer size; and
$B_{growth}$ is the amount of buffer size required to accommodate the buffer usage peak caused by the service interruption.

The inflated buffer may be implemented in several ways. For example, there may be a pool of temporary buffer space reserved for this procedure. The size of this pool can be dimensioned accordingly depending on the expected amount of handovers during unit time to the cell.

In order to allocate $B_{temp}$, $B_{growth}$ must be calculated. $B_{growth}$ depends on the actual data transfer rate before the handover ($R_d$), the outage time ($T_{out}$) and the base round-trip time ($RTT_{base}$). Bgrowth is approximately $R_d$ multiplied by the minimum of either $T_{out}$ or $RTT_{base}$, as shown in equation 2:

$$B_{growth} \cong R_d \times \min(T_{out}, RTT_{base}) \quad (2)$$

Figure 5:
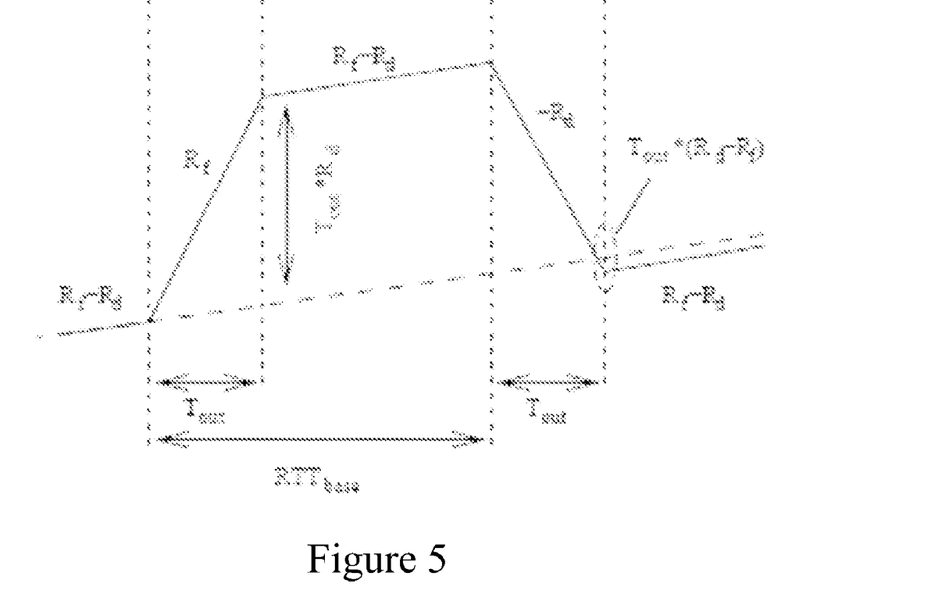
FIG. 5 illustrates buffer occupancy when $T_{out}$ is shorter than $RTT_{base}$.
Figure 6:
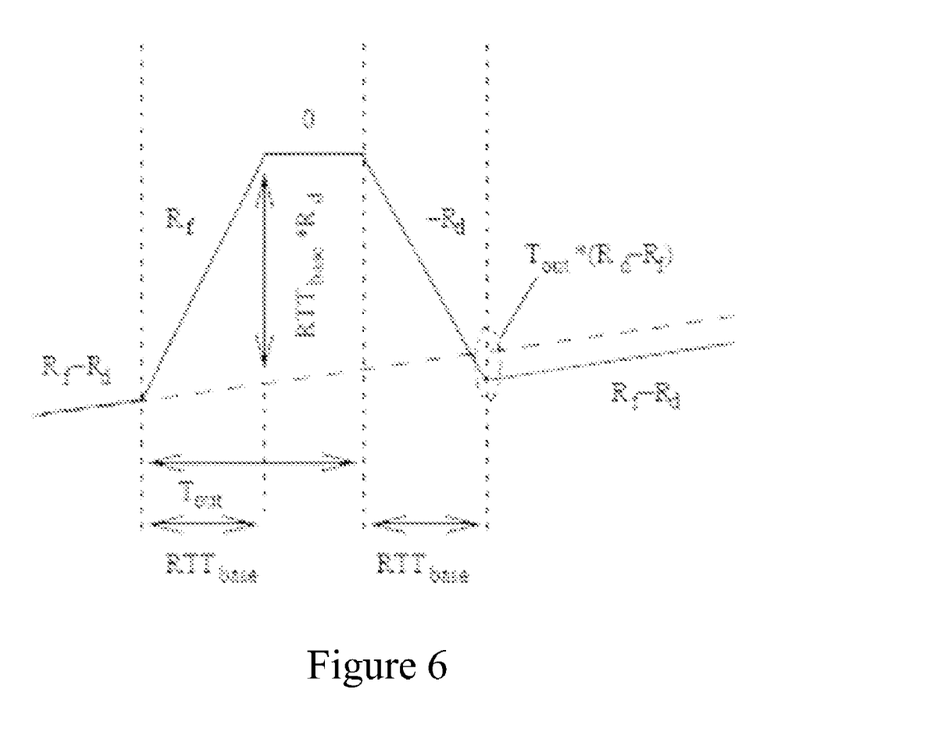
FIG. 6 illustrates buffer occupancy when $RTT_{base}$ is shorter than $T_{out}$.

The buffer occupancy over time evolves differently depending on whether $T_{out}$ or $RTT_{base}$ is shorter. FIG. 5 illustrates buffer occupancy when $T_{out}$ is shorter than $RTT_{base}$, and FIG. 6 illustrates buffer occupancy when $RTT_{base}$ is shorter than $T_{out}$.

Equation 1 is also valid also in for multiple TCP connections and UDP flows.

The time to complete the handover is independent of the state of the TCP data flow before the handover, so the probability of buffer overrun can be calculated as the ratio of time when there is no sufficient space in the buffer to accommodate the buffer growth ($T_{overrun}$) to the TCP sawtooth period ($T_{period}$), as shown in equation 3:

$$P_{overrun} = \frac{T_{overrun}}{T_{period}} \quad (3)$$

where $P_{overrun}$ is the probability of buffer overrun.

Since the buffer increase is linear, the above ratio can be written as shown in equation 4:

$$P_{overrun} = \frac{B_{growth}}{B_{size} - (B_{size} - BDP)/2} = \frac{2B_{growth}}{B_{size} + BDP} \quad (4)$$

where BDP is the bandwidth-delay product.

Figure 7:
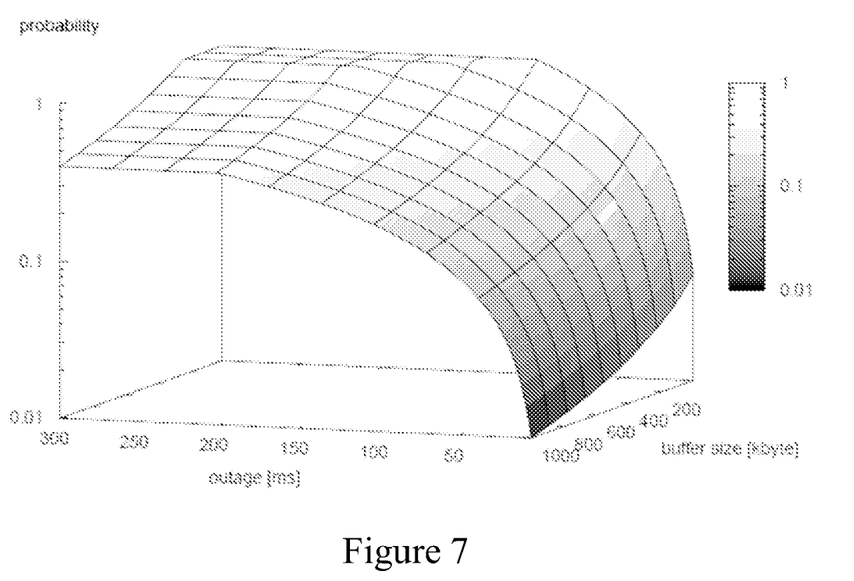
FIG. 7 shows a graph of the probability of buffer overrun against outage time and buffer size.

Referring to FIG. 7, $P_{overrun}$ can be seen with various outage times and buffer sizes calculated for a link rate of $R_d$=10 Mbps and $RTT_{base}$ of 200 ms. It can be seen that the probability of buffer overrun can be reduced if the buffer is appropriately sized to take handover outages into consideration.

Figure 8:
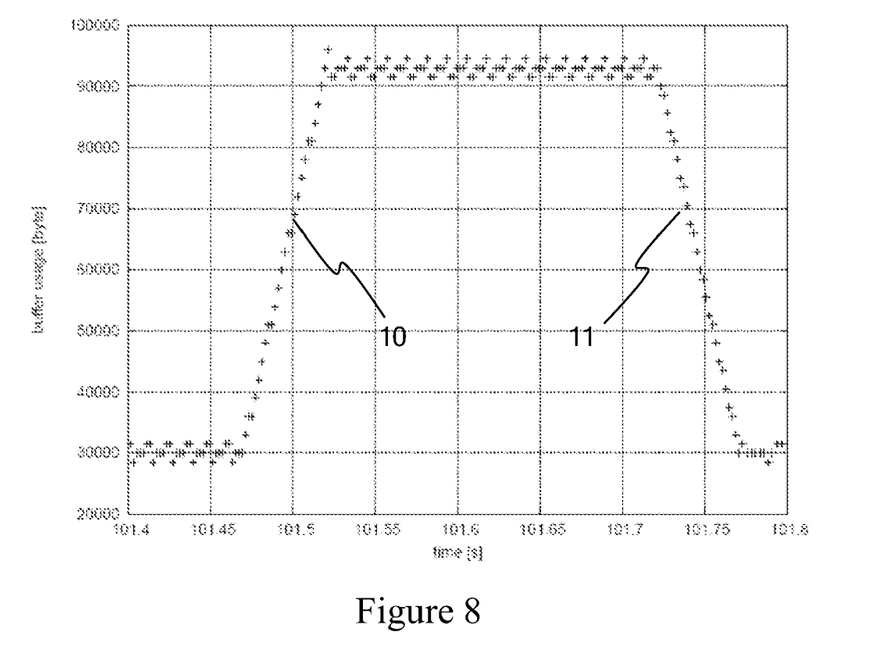
FIG. 8 is a graph of buffer usage against time showing an example buffering peak using a wireless emulation testbed.

Referring to FIG. 8, an example buffering peak is shown using a wireless emulation testbed. A NewReno TCP connection was measured in the congestion avoidance phase with a buffering peak caused by a link outage. Link capacity was set to 10 Mbps and the buffer size was set to 250 kbyte during the experiment. The base delay was 200 ms. The outage time was set to 50 ms and the handover occurred at around 101.45 s emulation time. As expected, the buffer increase 10 was over 60 kbyte, and the TCP transfer stopped due to ACK shortage after an RTT. This amount of buffer growth, unless compensated for, causes the TCP transfer to stop.

The calculations described above predict a buffer growth of $B_{growth}$=62.5 kbyte from around 30 kbyte, which closely matches the testbed result shown in FIG. 8. Using the analytic model, with this configuration, the probability of buffer overrun caused by handover is approximately 25%.

By calculating $B_{growth}$ at the BS or the mobile equipment, the buffer in the receiving node can dynamically allocate $B_{temp}$ to the mobile equipment at the handover, and so the probability of buffer overrun can be reduced to 0%.

After the handover has happened, the inflated buffer must to be released in order to make it available for other handovers. If the TCP data transfer is in a steady state, then the buffer occupancy decreases automatically after the outage time is over. The duration of the buffer peak is $T_{peak}$, and is defined according to equation 5:

$$T_{peak} = T_{out} + RTT_{base} \quad (5)$$

There are several strategies to deflate the buffer after $T_{peak}$:
Temporary buffer deletion
TCP friendly temporary buffer deflation Temporary Buffer Deletion A simple implementation of buffer deflation is to simply deallocate and free up the temporary buffer after $T_{peak}$ has expired. If there are packets in the buffer, they are deleted.

This strategy is easy to implement. Since the buffer overrun under normal steady state TCP data transfer is over within $T_{peak}$ automatically, in most cases there would be no packets to be discarded due to buffer deletion. Even if some packets were deleted, the majority of packets will still reach the receiving node and TCP recovery from packet losses happens significantly faster than without buffer inflation.

TCP Friendly Temporary Buffer Deflation

Temporary buffer deletion is not an optimal solution. New applications may start during the inflated period, or existing applications increase their data transfer rate for some reason, and so the temporary buffer still contains data packets after $T_{peak}$. In this case, it is necessary to send rate decrease signals via TCP to gradually free up the temporary buffer.

The proposed algorithm has the following steps:
1. Start timer $T_{final}$ when $T_{peak}$ has elapsed
2. On each packet departure from the buffer, the temporary buffer is decreased to (100+Burst) % of the actual buffer occupancy, but only if it is less than the current buffer size.
3. After every $T_{signal}$ time $N_{signal}$ packets are discarded from the queue. A faster TCP response is obtained if a packet is discarded from the head of the queue. When the buffer occupancy goes to zero, the deflation process ends.
4. When $T_{final}$ expires, free up the buffer regardless of its content and end the deflation process.

$T_{final}$ is a system parameter and it is necessary to be robust against non-responsive applications, for example streaming applications. $T_{final}$ should be sufficiently large to ensure that TCP has a chance to respond before the timer expires, for example 5-10 seconds.

Burst % is necessary to keep some buffer space for bursty packet arrivals. Recommended setting for Burst % is around 10%.

$T_{signal}$ controls the time frequency of when the algorithm sends a congestion signal to the TCP sender. The value is not crucial, but it is necessary to have it more than the expected RTT, for example around 1 second.

$N_{signal}$ is the number of packets to be discarded at each $T_{signal}$ period. The setting depends on the responsiveness and number of active TCP flows to the mobile. The recommended setting is between 1-4.

Example Calculation
Assume the following network case:
N=100 users in a cell
Base round-trip time RTT=100 ms
Handover interruption time 100 ms
Handover frequency: F=1/minute The usual setting for downlink buffers is BDP or 2*BDP. This is to ensure that TCP can survive a single buffer drop event.

Assume that the buffer growth is $B_{growth} = R_d*RTT$. It means that if the buffer size is BDP, the probability of buffer overrun is $P_{overrun} = 100\%$. If the buffer size is 2BDP, then $P_{overrun}$ is calculated according to equation 6:

$$P_{overrun} = 2 \times \frac{BDP}{(2BDP + BDP)} = 67\% \quad (6)$$

By dynamically allocating temporary buffer space to each user when a handover is required, $P_{overrun}$ is reduced to 0%.

If, instead of dynamically allocating temporary buffer space, a larger buffer was provided, in order to achieve a maximum overrun probability of $P_{overrun}$, a buffer size must be provided according to equation 7:

$$B_{size} > \frac{BDP \times (2 - P_{overrun})}{P_{overrun}} \quad (7)$$

Table 1 shows the buffer size required for a selection of $P_{overrun}$ values:

| $P_{overrun}$ | $B_{size}$ (as multiples of BDP) |
|---|---|
| 50% | 3 |
| 10% | 19 |
| 1% | 199 |

In contrast, the invention only requires extra buffer space during a handover. Using the same assumptions as the example above:

Number of handovers per second=$N*F$=100/60=1.67

Average amount of temporary buffer space required=$N*F*T_{peak}=N*F*(RTT+T_{out})$= 1.67*0.2=0.33

In summary, using the invention it is sufficient to allocate 1 BDP extra buffer space for the entire cell instead of e.g., 19*N=1900 BDP per cell. This means that the required extra buffer space in the node is between BDP/(N*BDP) and BDP/(N*2*BDP) that is between: 1% and 0.5%. The invention allows an operator to0 guarantee that TCP performance is not degraded during to handovers even at high data speeds or high mobility, whilst providing only a small amount of additional buffer space.

From the current 67%-100% overflow probability, the invention can reduce the overflow probability 0%. The data rate is not affected by intra-system handovers. Hardware cost is minimised by optimizing necessary buffer space from a pool. The invention requires just 0.5-1% extra buffering than is currently provided. In contrast, if buffer overrun were to be eliminated by simply allocating more buffer space statically, approximately 20 times more buffer space would be required, which has prohibitive costs.

Furthermore, the invention allows retransmissions losses to be reduced or eliminated, and by keeping buffer space low between handovers, fast response times can be ensured.

Figure 9:
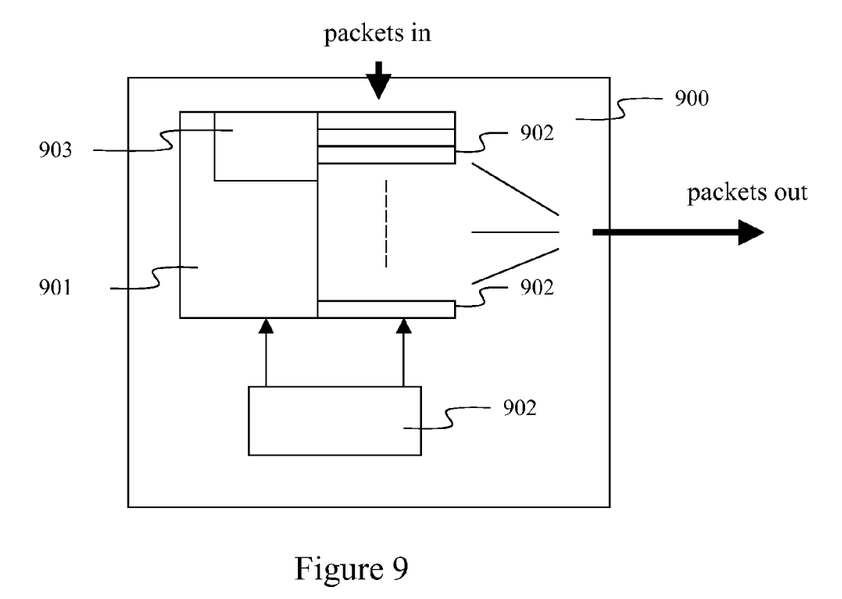
FIG. 9 illustrates schematically a network node for providing buffer space according to one embodiment of the invention.

In FIG. 9 a network node 900 is shown for use in an access network. The network node 900 comprises a buffer 901 a processor 902 for calculating an amount of temporary buffer space 903 required and means 904 for reserving a portion of the buffer according to the calculated amount of temporary buffer space required, the reserved portion for use during a cell handover.

Figure 10:
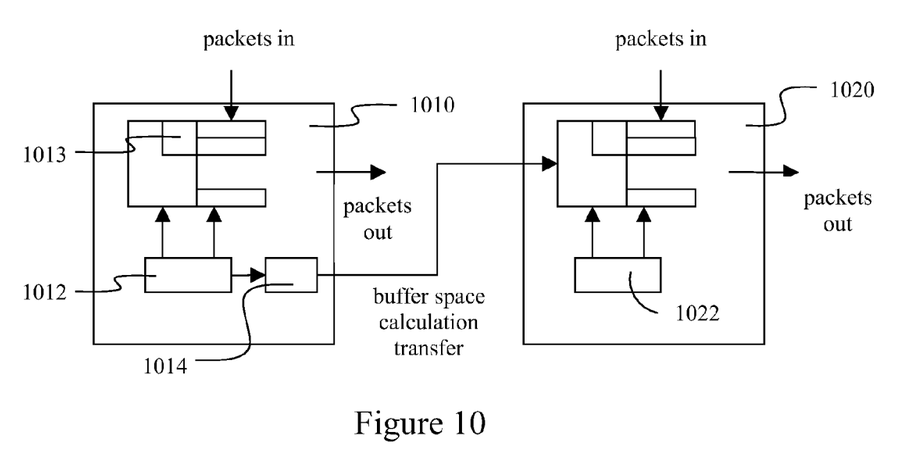
FIG. 10 illustrates schematically the transmission of buffer size information between network nodes according to an embodiment of the invention.

In FIG. 10 a network node 1010 is illustrated for use in a radio access network cell. In this embodiment the network node 1010 also comprises a processor 1012 for calculating an amount of temporary buffer space 1013 required but a transmitter 1014 is also provided for sending the calculated amount of temporary buffer space 1013 required to a node 1020 in a second radio access network cell. The node 1020 in the second radio access network cell is also furnished with a processor 1022 for situations when handover of mobile equipment from the radio access network cell to the second radio access network cell occurs.

It will be appreciated by the person of skill in the art that various modifications may be made to the above described embodiments without departing from the scope of the present invention. For example, the invention has been described in relation to TCP data flow, but can also be used for non-responsive data traffic e.g., non-standard TCP protocols, or UDP applications. Furthermore, the invention is described with reference to specific hardware. It will be appreciated that the calculations may be performed at various nodes in the network, for example at the mobile equipment, at the old cell, at a new cell, or at a central cell controller such as a Radio Network Controller.

The invention claimed is:

1. A method of reducing buffer overflow, in a cellular radio network, caused by a service interruption during a handover of mobile equipment from a first cell to a second cell occurs, wherein data is transferred using Transmission Control Protocol, the method comprising:
   calculating an amount of buffer space required to handle increased buffer usage caused by said service interruption as the product of a data transfer rate before cell handover and one of an outage time during cell handover and a base round trip time; and
   temporarily increasing the amount of buffer space required to handle increased buffer usage caused by said service interruption by the calculated amount.

2. The method according to claim 1, further comprising releasing the reserved buffer space when a predetermined time period has elapsed.

3. The method according to claim 1, further comprising sending Transmission Control Protocol rate decrease signals prior to releasing the reserved buffer space.

4. The method according to claim 1, wherein the step of calculating an amount of temporary buffer space required is performed at the first cell.

5. The method according to claim 1, wherein the step of calculating an amount of temporary buffer space required is performed at the second cell.

6. The method according to claim 1, wherein the step of calculating an amount of temporary buffer space required is performed at a cell controller.

7. The method according to claim 1, wherein the step of calculating an amount of temporary buffer space required is performed at a mobile equipment.

8. A network node for use in an access network comprising:
   a buffer;
   a processor for calculating an amount of temporary buffer space required as the product of a data transfer rate prior to cell handover and one of an outage time during cell handover and a base round trip time; and
   means for reserving a portion of the buffer according to the calculated amount of temporary buffer space required, the reserved portion for use during a cell handover.

9. A network node for use in a radio access network cell comprising:
   a processor for calculating an amount of temporary buffer space required as the product of a data transfer rate prior to cell handover and one of an outage time during cell handover and a base round trip time; and
   a transmitter for sending the calculated amount of temporary buffer space required to a node in a second radio access network cell when handover of mobile equipment from the radio access network cell to the second radio access network cell occurs.

* * * * *

UNITED STATES PATENT AND TRADEMARK OFFICE
CERTIFICATE OF CORRECTION

PATENT NO. : 8,170,557 B2
APPLICATION NO. : 12/525716
DATED : May 1, 2012
INVENTOR(S) : Andras Veres Page 1 of 8

It is certified that error appears in the above-identified patent and that said Letters Patent is hereby corrected as shown below:

Please delete the current Title Page and substitute it with the attached Title Page.

IN THE DRAWINGS:

Delete sheets 1-5 and replace with attached sheets 1-6.

IN THE SPECIFICATION:

Column 6, Line 50, delete "to0" and insert -- to --.

Signed and Sealed this
Thirteenth Day of May, 2014

Michelle K. Lee
*Deputy Director of the United States Patent and Trademark Office*

(12) United States Patent
Veres et al.

(10) Patent No.: US 8,170,557 B2
(45) Date of Patent: May 1, 2012

(54) REDUCING BUFFER OVERFLOW (75) Inventors: Andras Veres, Budapest (HU); Gabor Nemeth, Budapest (HU); Ferenc Kubinszky, Szentendre (HU); Gergely Biczok, Budapest (HU); Peter Tarjan, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 324 days.

(21) Appl. No.: 12/525,716

(22) PCT Filed: Feb. 8, 2007

(86) PCT No.: PCT/EP2007/051204
§ 371 (c)(1),
(2), (4) Date: Nov. 6, 2009

(87) PCT Pub. No.: WO2008/095535
PCT Pub. Date: Aug. 14, 2008

(65) Prior Publication Data
US 2010/0056151 A1 Mar. 4, 2010

(51) Int. Cl.
*H04W 36/00* (2009.01)
(52) U.S. Cl. ........ 455/436; 370/335; 370/229; 370/235; 370/232
(58) Field of Classification Search .......... 455/436, 444; 370/335, 229, 235, 232
See application file for complete search history.

(56) References Cited

U.S. PATENT DOCUMENTS

| | | | |
|---|---|---|---|
| 5,315,586 A * | 5/1994 | Charvillat | 370/232 |
| 5,898,671 A * | 4/1999 | Hunt et al. | 370/235 |
| 6,993,342 B2 * | 1/2006 | Kuchibhotla et al. | 455/450 |
| 2001/0015956 A1 * | 8/2001 | Ono | 370/229 |
| 2002/0137514 A1 | 9/2002 | Mitsugi et al. | |
| 2003/0031210 A1 * | 2/2003 | Harris | 370/516 |
| 2004/0246930 A1 * | 12/2004 | Fong et al. | 370/335 |
| 2006/0077994 A1 | 4/2006 | Spindola | |
| 2007/0014259 A1 | 1/2007 | Fajardo et al. | |
| 2011/0273985 A1 * | 11/2011 | Siemens et al. | 370/235 |

FOREIGN PATENT DOCUMENTS

| | | |
|---|---|---|
| EP | 1 507 352 A1 | 2/2005 |
| WO | WO 01/30090 A | 4/2001 |
| WO | WO 2007/007913 A1 | 1/2007 |

* cited by examiner

*Primary Examiner* — Charles Shedrick (57) ABSTRACT

A method of reducing buffer overflow in a cellular radio network caused by a transfer of data from a buffer in a first cell to a buffer in a second cell when a handover of mobile equipment from said first cell to said second cell occurs. The method comprises temporarily increasing an amount of temporary buffer space required to handle data transferred from the buffer of the first cell to the buffer of the second cell. In one embodiment of the method, prior to increasing the amount of temporary buffer space, the amount of temporary buffer space required is calculated.

9 Claims, 6 Drawing Sheets